United States Patent
Merlo et al.

(10) Patent No.: US 10,890,220 B2
(45) Date of Patent: Jan. 12, 2021

(54) VEHICLE BRAKING UNIT, BRAKE PAD AND ASSOCIATED METHODS

(71) Applicant: ITT ITALIA S.r.l., Lainate (IT)

(72) Inventors: Fabrizio Merlo, Barge (IT); Agustin Sin Xicola, Barge (IT); Pietro Bertoldo, Barge (IT); Alessandro Angeleri, Barge (IT)

(73) Assignee: ITT ITALIA S.r.l., Lainate (IT)

( * ) Notice: Subject to any disclaimer, the term of this patent is extended or adjusted under 35 U.S.C. 154(b) by 116 days.

(21) Appl. No.: 15/746,668

(22) PCT Filed: Jul. 21, 2016

(86) PCT No.: PCT/IB2016/054357
§ 371 (c)(1),
(2) Date: Jan. 22, 2018

(87) PCT Pub. No.: WO2017/013619
PCT Pub. Date: Jan. 26, 2017

(65) Prior Publication Data
US 2018/0216680 A1 Aug. 2, 2018

(30) Foreign Application Priority Data
Jul. 21, 2015 (IT) .......................... 102015000036616

(51) Int. Cl.
*F16D 65/02* (2006.01)
*F16D 55/227* (2006.01)
(Continued)

(52) U.S. Cl.
CPC ............ *F16D 55/227* (2013.01); *B62L 1/005* (2013.01); *F16D 55/22* (2013.01);
(Continued)

(58) Field of Classification Search
CPC .............. F16D 65/095; F16D 65/0972; F16D 65/0977; F16D 65/0978; F16C 33/201; F16C 2208/32; F16C 2208/90
See application file for complete search history.

(56) References Cited

U.S. PATENT DOCUMENTS 3,722,634 A * 3/1973 Ogasawara ......... F16D 65/0006
188/73.37
4,143,204 A * 3/1979 Fang ........................ B05D 5/08
427/385.5
(Continued)

FOREIGN PATENT DOCUMENTS

CN 103335043 A 10/2013
DE 10 2006 003907 A1 8/2007
(Continued)

OTHER PUBLICATIONS

Machine translation of JP 6-076813, retrieved Sep. 15, 2019 (Year: 2019).*
(Continued)

*Primary Examiner* — Bradley T King
(74) *Attorney, Agent, or Firm* — Barclay Damon LLP (57) ABSTRACT

A vehicle braking unit comprising a support designed to be positioned in use close to an element to be braked, braking elements which are carried in a movable way by the support, actuation elements which are carried by the support for pushing the braking elements against the element to be braked and first and second guide surfaces that are integral, respectively, to the braking elements and to the support, and that cooperate together to guide and support the braking elements when they are moved towards the element to be braked by the activation of the actuation elements; the first and/or the second guide surfaces are covered by a sliding coating consisting of a polymeric resin layer with solid
(Continued)

lubricants and/or anti-friction materials being dispersed therein, that has been cured at a temperature greater than 300° C.

17 Claims, 5 Drawing Sheets

(51) Int. Cl.
    *F16D 55/22*     (2006.01)
    *B62L 1/00*     (2006.01)
    *F16D 65/097*     (2006.01)
    *C10N 30/06*     (2006.01)
    *C10N 50/00*     (2006.01)
    *B32B 27/08*     (2006.01)

(52) U.S. Cl.
    CPC .......... *F16D 65/0977* (2013.01); *B32B 27/08* (2013.01); *C10M 2201/066* (2013.01); *C10N 2030/06* (2013.01); *C10N 2050/015* (2020.05); *F16D 2250/0046* (2013.01)

(56) References Cited

U.S. PATENT DOCUMENTS

| | | | | |
|---|---|---|---|---|
| 5,727,659 | A | * | 3/1998 | Brown ................ F16D 55/2262 188/72.7 |
| 2002/0155304 | A1 | * | 10/2002 | Tanaka ..................... B05D 5/08 428/458 |
| 2003/0185474 | A1 | * | 10/2003 | Tanaka .................. F16C 33/201 384/297 |
| 2007/0068750 | A1 | * | 3/2007 | Hara .................... F16D 69/0408 188/251 A |
| 2012/0073915 | A1 | | 3/2012 | Kahan et al. |
| 2013/0025983 | A1 | | 1/2013 | Wolf |
| 2013/0244039 | A1 | * | 9/2013 | Peters ................. F16D 65/0006 428/411.1 |
| 2014/0041971 | A1 | | 2/2014 | Hujer |
| 2016/0319211 | A1 | * | 11/2016 | Barth .................. C09D 161/06 |

FOREIGN PATENT DOCUMENTS

| | | |
|---|---|---|
| DE | 10 2011 121765 A1 | 6/2013 |
| GB | 1 207 328 | 9/1970 |
| JP | 6076813 B * | 9/1994 |
| KR | 10-1440757 B1 | 9/2014 |

OTHER PUBLICATIONS

International Search Report and Written Opinion for PCT/IB2016/054357; dated Oct. 27, 2016; 13 pages.

* cited by examiner

VEHICLE BRAKING UNIT, BRAKE PAD AND ASSOCIATED METHODS

CROSS-REFERENCE TO RELATED APPLICATIONS

This application is a national stage application under 35 U.S.C. § 371 of International Application No. PCT/IB2016/054357, filed Jul. 21, 2016, which claims priority upon Italian Patent Application No. 102015000036616, filed Jul. 21, 2015, the entire contents of each application herein being incorporated by reference.

TECHNICAL FIELD OF THE INVENTION

The present invention relates to a vehicle braking unit, in particular a brake caliper unit for a disc brake, featuring low residual torque. The invention further relates to an associated brake pad, which can be advantageously used with the brake caliper unit of the invention, to a method for obtaining it and to a method for obtaining the reduction in residual torque.

PRIOR ART

It is known that one of the main problems in brake units for disc brakes is that of residual torque, a phenomenon generated by the fact that the brake pads "touch" the disc even when the brake is not being used, for example due to poor alignment of the brake calipers or else due to other phenomena associated with an anomaly or simply due to less than optimal functioning of the brake caliper actuators (in general hydraulic pistons or else electric actuators) that in use, press the brake pads against the disc when the brake pedal is pressed by a user. This leads to abnormal wearing of the brake pads and undesirable resistance to the movement of the vehicle, which increases fuel consumption and carbon dioxide emissions.

US2013/0025983, in order to overcome or at least reduce this inconvenience, provides the use of special low friction seals on the pistons which, under the pressure from the brake fluid, slide within suitable brake caliper seats in order to push against the brake pads. It was however found that this solution does not effectively overcome the inconvenience described.

GB 1207328 describes a brake unit wherein at least one of a pair of mutually sliding surfaces has a coating layer consisting of an elastically deformable material such as an elastomer or polymer, in order to ensure good contact and to avoid noise. US2014/0041971 describes instead a bicycle brake wherein a wedge, that controls the opening and closing of a pair of forked arms that carry the braking elements, features a sliding surface that is in contact with the top of at least one of the two arms and that can be covered with a hard layer such as chrome or "diamond-like" carbon, with a metal or ductile metal alloy such as brass or bronze or with a polymeric antifriction layer completely made of PTFE, or just coated with a layer of lubricant.

Both of these last two documents do not relate to the problem of reducing the residual torque in a vehicle braking unit and the solutions described therein are not capable of solving this problem.

SUMMARY OF THE INVENTION

The purpose of the present invention is to provide a vehicle braking unit, in particular a brake caliper unit for a disc brake, that features reduced or negligible residual torque.

The invention thus relates to a vehicle braking unit, in particular a brake caliper unit for a disc brake, and to a braking element such as a brake pad that is conveniently usable with such a brake caliper unit, as defined in the appended claims. The invention further relates to associated methods for obtaining the braking element and for reducing the residual torque in a vehicle braking system.

According to a main aspect of the invention, first and/or second guide surfaces that are integral, respectively, to braking elements such as a brake pad and to a support for the braking elements such as a brake caliper, and that cooperate together to guide and support the braking element when it is moved towards an element to be braked by the activation of the actuation elements, are at least partially or better still completely covered by a sliding coating or layer consisting of a polymeric resin layer having solid lubricants and/or anti-friction materials dispersed therein.

The polymeric resin is a phenolic based resin, of the same type used to make the blocks of friction material of the braking elements.

The sliding coating or layer consists of a layer of phenolic based polymeric resin within which a material is dispersed, which material is selected from the group consisting of: PTFE, molybdenum sulfide or disulfide, mixtures thereof, in a quantity of between 7% and 25% by volume of the total volume of the sliding coating or layer.

The sliding coating or layer is baked/cured at a temperature equal to or greater than 300° C. and preferably between 350° C. and 500° C., for between 20 to 60 minutes.

Surprisingly, this sliding layer or coating results in a drastic reduction in the residual torque of the braking unit or vehicle braking system on those guiding surfaces it is applied to.

BRIEF DESCRIPTION OF THE DRAWINGS

Further characteristics and advantages of the present invention will become clear from the following description of its exemplary non-limiting embodiments given purely by way of example and with reference to the drawings attached, in which.

DETAILED DESCRIPTION

Figure 1:
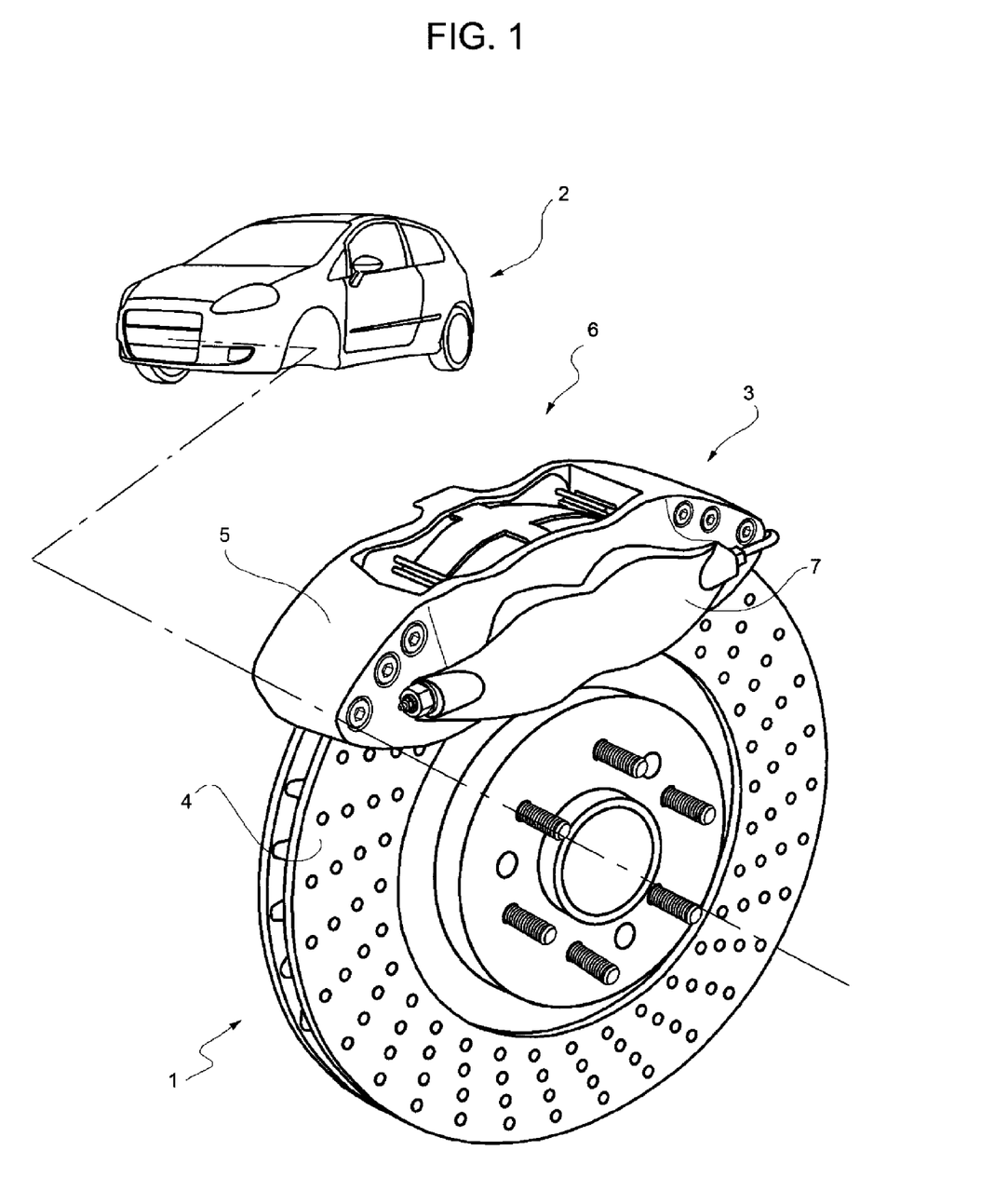
FIG. 1 schematically illustrates a vehicle and in an enlarged scale its braking systems including a braking unit produced according to the invention.

With reference to FIG. 1, the reference number 1 indicates a vehicle's braking system 2 comprising a braking unit 3 and an element to be braked 4, specifically defined in the non-limiting but preferred example illustrated, by a brake caliper unit 3 and by a disc brake 4.

With reference to FIGS. 2 to 5, the braking unit or brake caliper unit 3 for a brake disc 4 comprises a support 5, in the example illustrated consisting of a brake caliper body designed to be positioned in use close to an element to be braked or disc brake 4, in particular astride of it, braking elements 6 (FIGS. 2 and 3) which are carried in a movable way by the support 5 and which are suitable for cooperating by friction, in use, with the element to be braked, and actuation elements 7, of a type known in the art, which are carried by the support 5 and which are suitable, when activated, for pushing the braking elements 6 against the element to be braked 4 in order to apply upon the same, by friction, a braking torque.

In the example shown, the braking elements consist of a pair of vehicle braking elements, in particular consisting of brake pads 6, of which only one is illustrated for simplicity, carried by the support 5 in opposing positions, on both sides of the brake disc 4, in a known way and therefore not shown for simplicity.

The braking system 1 further comprises first guide surfaces 8 and second guide surfaces 9 that cooperate with one another in order to guide and support the braking elements 6 when they are moved in a known way by the actuation elements 7 towards the element to be braked 4.

The guide surfaces 8 are integral to the braking elements 6; in fact, each braking element 6 comprises a metallic support element 10, that integrally supports a block of friction material 11 upon a first face 12 thereof which is designed to face in use towards an element to be braked, in the example illustrated the brake disc 4; in the example illustrated the braking element consists of a brake pad 6, and the metallic support element 10 is manufactured in the form of a flat plate.

In every case, the metallic support element 10 comprises a guide portion 13 (in the examples shown two opposing guide portions or hammers 13) for guiding the braking element 6 within a guide element 14 (FIGS. 3 and 5) of the support 5 of the braking unit 3 and the guide surfaces 8 are delimiting surfaces of the guide portion 13 of the metallic support element 10.

The guide surfaces 9 are instead integral to the support 5 and consist (FIG. 5) of delimiting surfaces of the guide element 14 of the support 5 facing the guide surfaces 8 of the braking element 6, or (FIGS. 3 and 4) of a lateral inner surface of a retaining spring 15 for the braking element 6 which is integrally carried, in a known way, by the guide element 14 of the support 5 and which cooperates by contacting and sliding against the guide portion 13 of the braking element 6.

According to the main characteristic of the invention, one of the guiding surfaces 8 or 9, or both, is covered at least in part, and preferably completely covered by a sliding coating or layer 16 consisting of a polymeric resin layer having solid lubricants and/or anti-friction materials dispersed therein, preferably in the form of particles dispersed within the phenolic resin, which behaves as a matrix.

The polymeric resin is a phenolic resin that has been cured at a temperature higher than 300° C. and that contains dispersed therein a low friction coefficient fluorinated polymer and/or a metallic sulfide; in particular, the polymeric resin contains dispersed therein polytetrafluoroethylene (PTFE) and/or molybdenum disulfide.

In particular, the sliding coating or layer 16 consists of a polymeric mixture including from 80% to 90% by volume of a phenolic resin polymer and from 11% to 20% by volume of only PTFE; or else it consists of a polymeric blend including from 70% to 92% by volume of a phenolic resin polymer, from 6% to 22% by volume of PTFE and from 1.5% to 3.5% by volume of a molybdenum sulfide.

Figure 2:
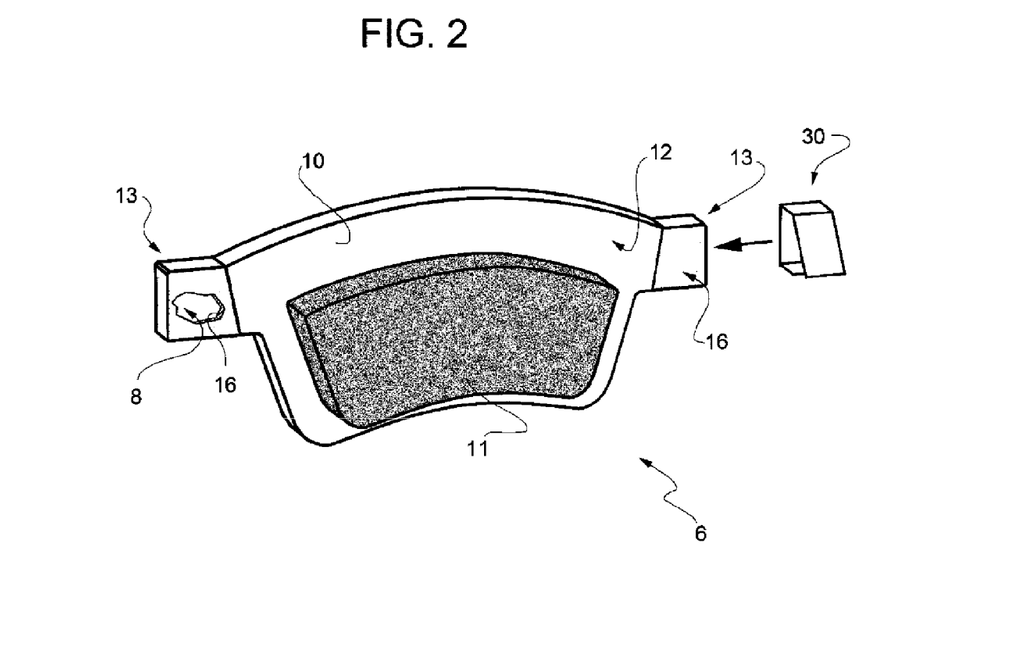
FIG. 2 schematically illustrates a component of the braking unit of the FIG. 1 according to a first embodiment of the invention.
Figure 3:
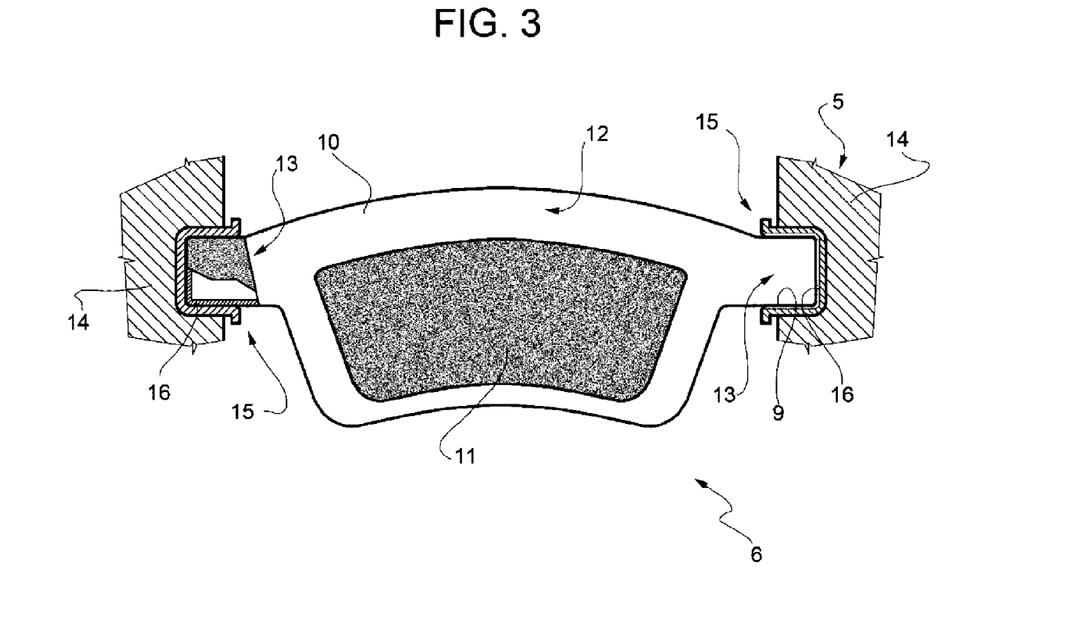
FIG. 3 schematically illustrates part of the braking unit of FIG. 1 produced according to two possible embodiments of the invention.

According to the preferred embodiment, illustrated in FIG. 2 and on the left side of FIG. 3, the sliding layer or coating 16 is arranged over the first guide surfaces 8; the invention therefore consists in this case of a vehicle braking element 6, in particular consisting of a brake pad, including a block of friction material 11 and a metallic support element 10 that integrally supports the block of friction material 11 upon a face 12 thereof which is designed to face in use towards an element to be braked 4, and that includes a guide portion 13 defined in the example illustrated by two hammer-like lateral appendages of the support element 10, covered with a sliding layer 16 consisting of an anti-friction material applied directly to the metallic support element 10. The sliding layer or coating 16 upon the portion 13 consists of a layer of a phenolic based polymer resin within which is dispersed, in the form of particles, a material selected from the group consisting of: PTFE, molybdenum sulfide or disulfide, mixtures thereof, to an extent of between 7% and 25% by volume of the total volume of the coating 16.

According to this embodiment, each brake pad 6 is mounted on the support 5 and can slide on a pair of known retention springs 15 which are integral to the support 5 and which are seated within the guide elements 14 whereby the layer or coating 16 cooperates in use in contact with the retaining springs 15.

Figure 4:
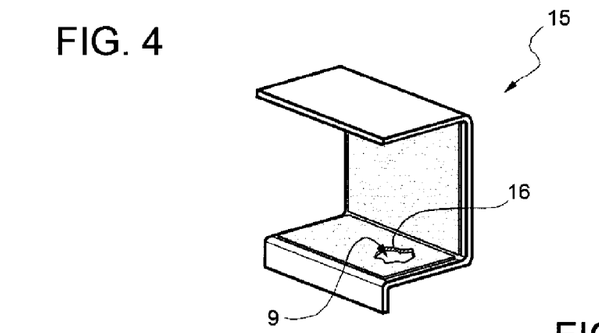
FIG. 4 schematically shows a further component of the braking unit of FIG. 1 according to a possible embodiment of the invention.

According to the alternative embodiment shown in FIG. 4 and on the right side of FIG. 3, the sliding coating or layer 16 is arranged upon the second guiding surfaces 9, which consist of the internal lateral surface of each retaining spring 15, which is in turn integrally carried by the guide element 14 of the support 5 and which cooperates by contacting and sliding against a guide portion 13 of the braking element 6, which is instead of the traditional type, simply painted or treated with a corrosion protection layer.

Figure 5:
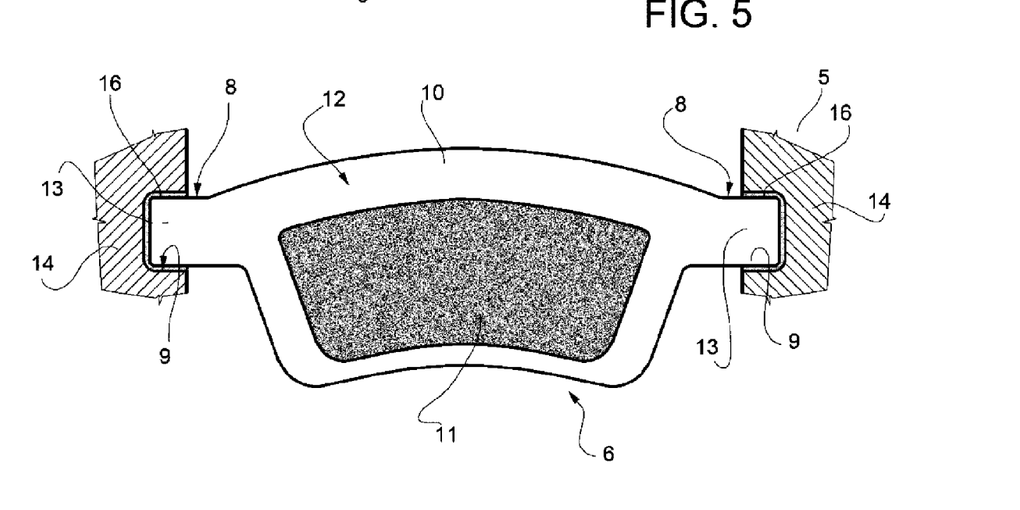
FIGS. 5 and 6 schematically illustrate part of the braking unit of FIG. 1 produced according to two further embodiments of the invention.

According to the alternative embodiment shown in FIG. 5, the springs 15 may also be absent and the sliding layer or coating 16 is in this case carried by the guiding surfaces 9 consisting of the delimiting surfaces of the guide element 14 of the support 5 facing the first guide surfaces 8 of the braking element 6.

Figure 6:
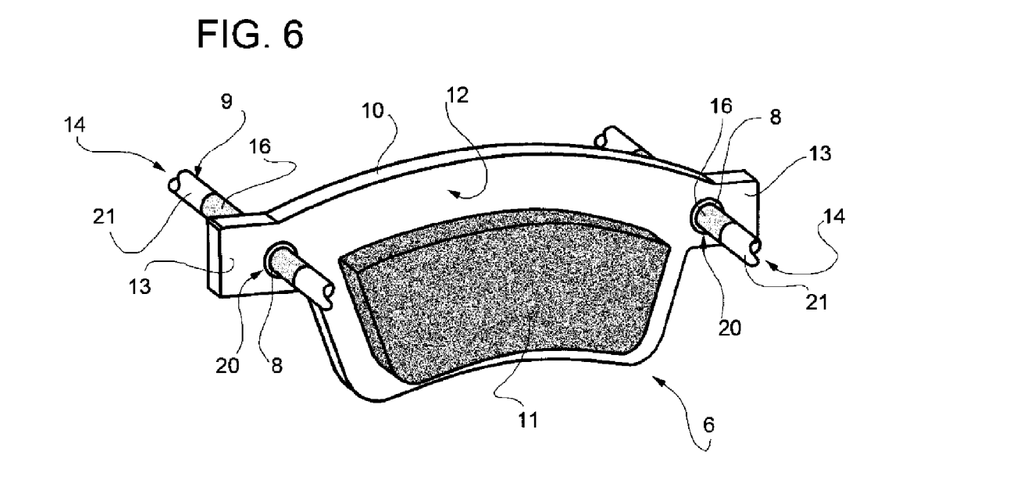

Finally, with reference to FIG. 6, wherein details that are similar or equal to those already described are indicated for simplicity with the same reference numbers, the guiding surfaces 8 and 9 can also be defined, respectively, as the surfaces 8 of an internal lateral surface of through holes 20 drilled through the metallic support element 10 in correspondence to the guide portion 13, and the surfaces 9 of an external lateral surface of respective pins 21 integrally carried by the support 5 and which therefore constitute the guide element 14 of the support 5. In this case the sliding layer or coating 16 is carried by the pins 21 and therefore by the guide surfaces 9.

Obviously, as already indicated, in all of the embodiments the sliding layer or coating 16 can be applied, wherever possible (for example in the absence of corrosion-proof coating layers), to both guide surfaces 8 and 9.

Experimental trials conducted by the Applicant have surprisingly revealed, as shall be seen, that in braking systems where one or both of the guide surfaces 8, 9 are covered with a sliding coating 16, the residual torque, i.e. the braking torque that is applied by the brake pads 6 to the brake disc 4 even when the actuation elements 7 are not enabled, in so far as the brake pads 6 still "touch" the brake disc 4, is drastically decreased in comparison to an identical braking system devoid of the coating 16 on the surfaces 8 and/or 9. This, supposedly, in so far as the reduced friction between the surfaces 8 and 9, as guaranteed by the presence upon one of these (or both) of an antifriction layer 16, allows recovery elements normally found in known braking systems and based upon springs or special seals (in the case of hydraulic actuator elements) to reposition the brake pads 5, after each braking event, in substantially their original positions before said braking event.

From the above, it is evident that the invention also relates to a method for the manufacture of a vehicle braking element 6 designed to limit the development of residual torque in a vehicle braking system such as the braking system 1 described, comprising the steps of:

manufacturing a raw metallic support element 10 (i.e. obtained from a metallic sheet by blanking and sanding only) bearing the guide portion 13;

covering the guide portion 13 of the raw metallic support element 10 with a sliding layer 16 consisting of a phenolic-based resin having solid lubricants and/or anti-friction materials dispersed therein;

heating/curing the entire raw metallic support element 10 provided with the guide portion 13 covered with the sliding layer 16 at a temperature between 350 and 500° C.;

subsequently arranging screening elements 30 (FIG. 2) on the guide portion 13 in order to protect the previously heated sliding layer 16;

forming a layer or block of friction material 11 upon the metallic support element, curing the friction material layer 11 and painting the braking element 6 thus obtained; and removing the screening elements 30 in order to obtain a braking element 6, as that shown in FIG. 2, having the guide portion 13 delimited by a sliding surface consisting of the sliding layer 16, which layer is directly anchored to the metallic support element 10.

The invention also relates to a method for obtaining a reduction in the residual torque in a vehicle braking system of the kind already described in FIG. 1, comprising the steps of:

heating/curing the sliding layer at a temperature equal to or greater than 300° C.

The invention is now further described by means of the following practical implementation example.

Example

A series of identical brake pads of the type schematically illustrated in FIG. 2 is manufactured in a known way. The guide portion 13 of some of these pads is coated with a sliding layer or coating with a thickness of between 200 and 300 microns, acting upon the raw metallic support element 10 and which is heated in an oven at 400° C. for 30 minutes. Brake pads are then manufactured by means of the same standard known industrial process but providing the protection of the guide portion 13. Two different compositions for the sliding layer 16 as reported in table 1 are then tested.

TABLE 1

| Components/Coating | Type A [% by vol] | Type B [% by vol] |
|---|---|---|
| Molybdenum disulfide | 1.8 | NO |
| PTFE | 6.8 | 19.6 |
| Phenolic resin | 91.4 | 80.4 |

Further brake pads are manufactured using the same process but leaving the guide portions 13 without the coating 16; the guide portions 13 of these pads are painted as per the rest of the metallic support element.

Finally, some of these brake pads are manufactured in the manner already described but coating the guide portion 13 with a commercial antifriction layer produced by DOW Corning "Molykote D-708" ®; this layer, which according to the manufacturer contains PTFE, is heated according to the manufacturer's instructions at 180° C. for 60 minutes.

A set of retaining springs is also prepared for the type of brake pad prepared, the internal lateral surface of which is coated with a layer of antifriction material according to the compositions of table 1 or else with a layer of "Molykote D-708" ®.

All of the brake pads thus obtained are coupled to the springs thus prepared or else to identical springs that are devoid of an antifriction coating and are subjected to the following tests:

Each brake pad is mounted on the same brake caliper with a hydraulic actuator and is connected to a dynamometer;

The dynamometer is used to measure the peak of the maximum force detected over the entire length of the path of the brake pad that slides within a coated, or not coated, spring mounted on the caliper;

The brake pad is first inserted in an initial position (outer caliper);

The piston is aligned in order not to generate an asymmetric shift of the guide portions 13;

The piston is spaced 1 mm away from the brake pad;

The piston is advanced manually until it reaches the end of its travel.

The peak value of the force measured by the dynamometer is reported. The results obtained are given in table 2 in Newtons.

TABLE 2

| Spring/pad | NO coating | Coating A | Coating B | Coating Dow |
|---|---|---|---|---|
| NO coating | 23.2 ± 2 | 12.1 ± 1.8 | 8.9 ± 1.8 | 16.6 ± 1.1 |
| Coating A | 5.7 ± 2.2 | 4.2 ± 1.7 | 6.2 ± 1.7 | 8.0 ± 1.1 |
| Coating B | 3.4 ± 0.8 | 4.8 ± 1.5 | 4.9 ± 0.8 | 5.8 ± 1.3 |
| Coating Dow | 11.0 ± 0.9 | | | 14.1 ± 1.6 |

As it is immediately possible to detect, the peak force with respect to the brake pads and/or springs uncoated with the antifriction coatings of the invention is reduced to ⅕ or less; compared to the known DOW Corning coating the peak force is reduced by more than half. The best results are obtained with the application of coating B on the spring only and with coating A covering only the brake pad, which confirms the absolute unpredictability of the results obtained and therefore the inventiveness of the solutions adopted.

For completeness sake, the same test is repeated using brake pads with a metallic support or backplate that is phosphated, zinc-nickel plated or nitrided instead of being painted. The results are given in Table 3.

As can be seen, the results for the treated supports that are coupled to normal springs are decidedly negative. The results for the treated supports that are coupled to springs having the coating according to the invention are on the other hand better than with no coating.

TABLE 3

| Spring/pad | Phosphated Supports | Zn—Ni Supports | Nitrided Supports |
|---|---|---|---|
| NO coating | 33.8 ± 1.9 | 29.2 ± 1.2 | 40.7 ± 12.2 |
| coating A | 6.8 ± 0.3 | 7.7 ± 0.5 | 22.8 ± 2.1 |
| coating B | 7.5 ± 0.8 | 7.3 ± 0.5 | 18.6 ± 1.1 |
| Dow coating | 13.6 ± 0.6 | 13.9 ± 0.7 | 31.3 ± 4.5 |

Figure 7:
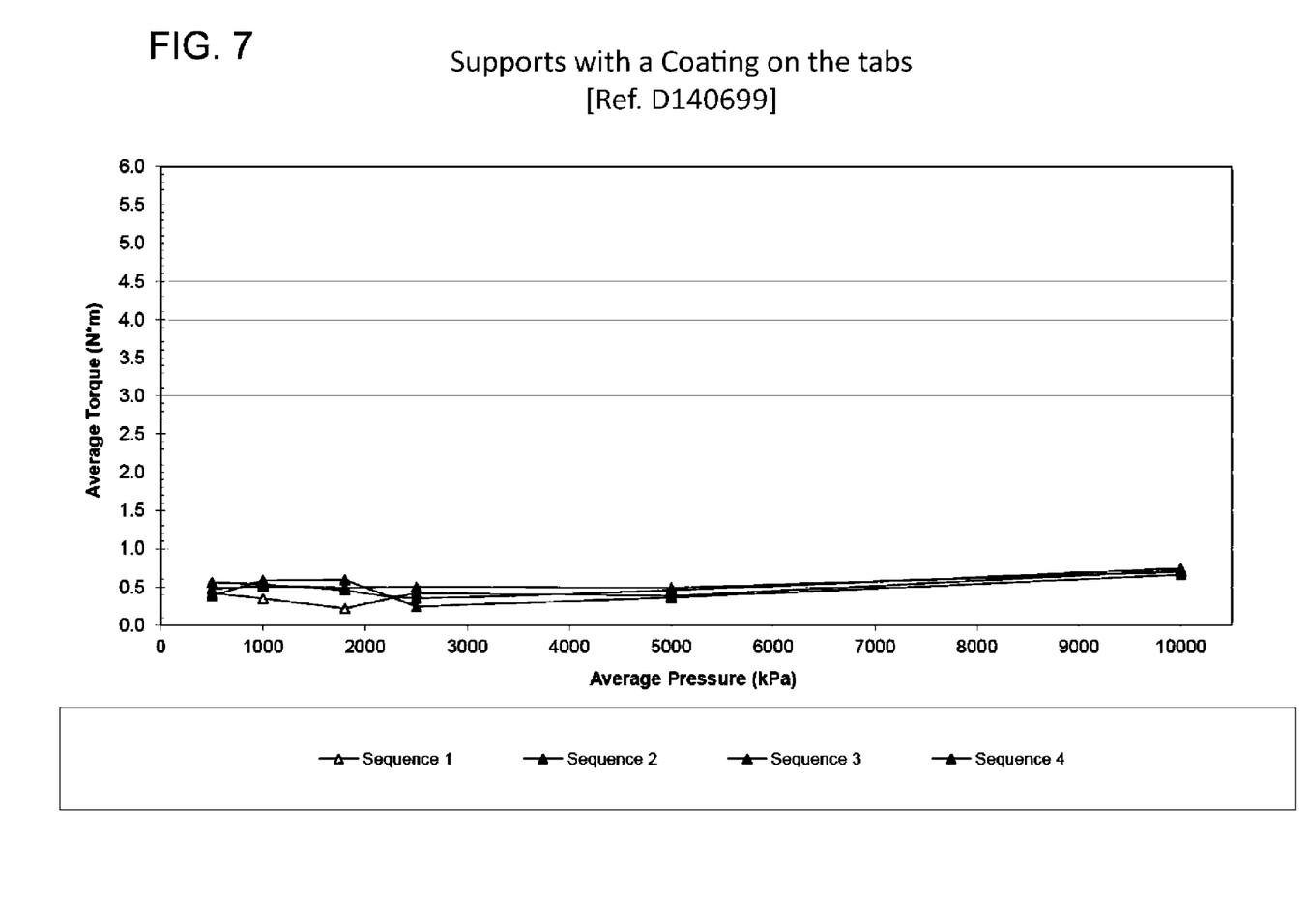
FIGS. 7 and 8 graphically illustrate the results of comparative tests carried out on the same vehicle braking unit according to the invention or else according to the prior art.
Figure 8:
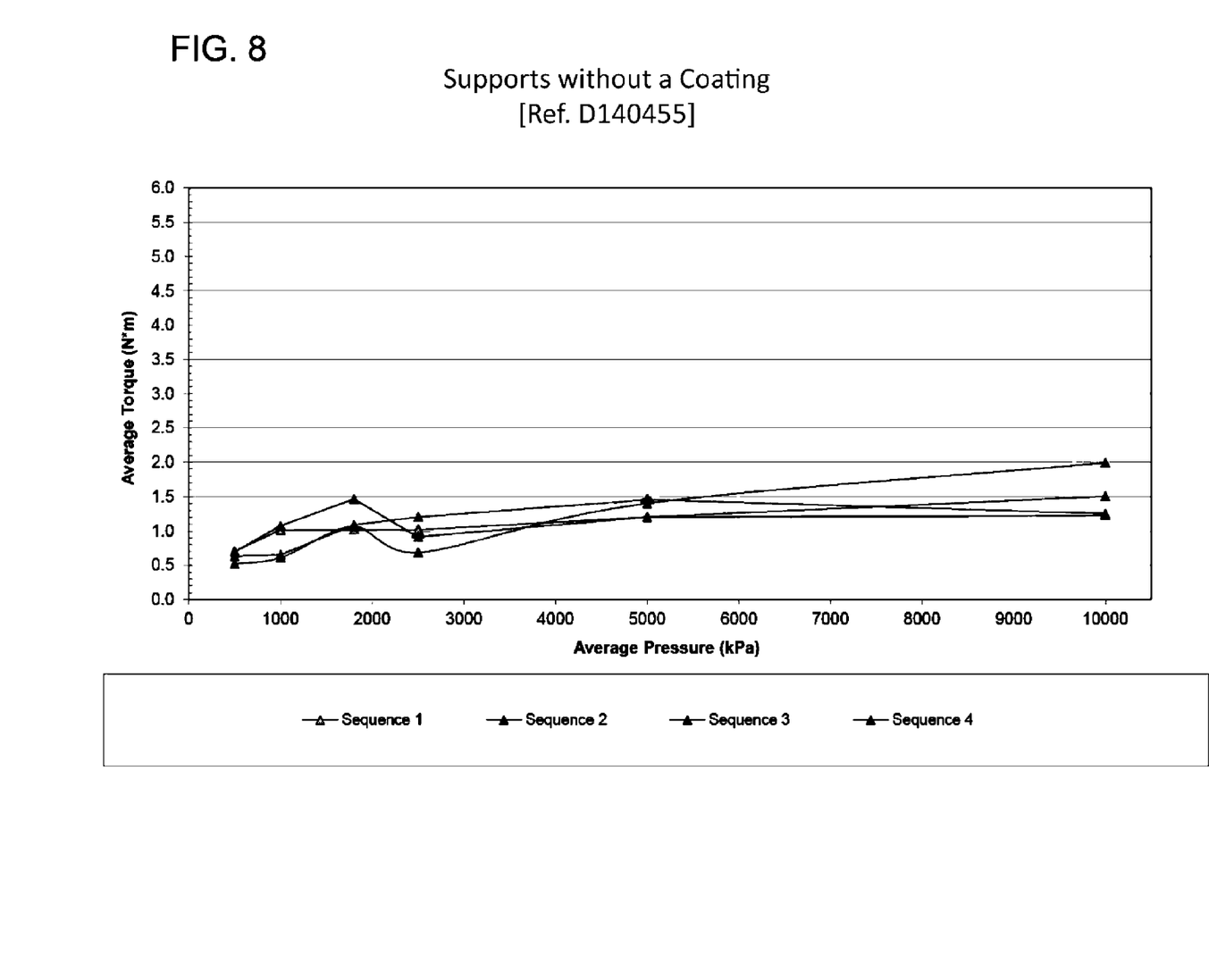

With reference to FIGS. 7 and 8, the brake pads with the guide portion that is coated with the compositions of Table 1 and that is not coated, were mounted on a bench and subjected to sequential braking tests. The residual torque after braking was detected on board. Briefly, after mounting the pads on a bench, they are spaced apart up to the maximum value from the brake disc; subsequently, while the brake disc rotates at a constant speed (800 RPM) the braking pressure indicated on the abscissa is applied for 10 seconds; the brake pressure is released and the residual torque noted on the dynamometer while the disc continues to rotate at a constant speed and the values measured for the braking pressure originally applied are reported in order. The test is then repeated with a greater braking pressure. The test sequence is then repeated and the curves of FIGS. 7 and 8 are obtained.

As can be seen by comparing the graphs of FIG. 8 (pads without an antifriction coating) and FIG. 7 (pads with antifriction coating A), the residual torque is reduced by more than half and up to ⅓.

The objectives of the invention are therefore fully achieved.

The invention claimed is:

1. A vehicle braking unit comprising:
a support designed to be positioned close to an element to be braked;
braking elements which are carried in a movable way by the support and which are suitable for cooperating, by friction, with the element to be braked;
actuation elements carried by the support and which are suitable, when activated, for pushing the braking elements against the element to be braked in order to apply upon the same, by friction, a braking torque; and
first and second guide surfaces that are integral, respectively, to the braking elements and the support, and that cooperate together to guide and support the braking elements when they are moved towards the element to be braked by the activation of the actuation elements;
wherein at least one of the first and second guide surfaces are at least partially covered by a sliding coating comprising a phenolic-based polymeric resin layer within which there is dispersed, as particles, material selected from the group of: PTFE, molybdenum sulfide or disulfide, and mixtures of PTFE and molybdenum sulfide or disulfide, with the dispersed material constituting between 7% and 25% by volume of the total volume of the sliding coating, and in which the sliding coating has a total thickness between 200 and 300 microns.

2. The braking unit according to claim 1, wherein the polymeric resin layer contains a phenolic resin that has been cured at a temperature equal to or higher than 300° C. for a time no longer than one hour.

3. The braking unit according to claim 1, wherein the sliding coating is a polymeric mixture comprising,
from 80% to 90% by volume of a phenolic-based polymeric resin, and
from 11% to 20% by volume of PTFE.

4. The braking unit according to claim 1, wherein the sliding coating is a polymeric mixture comprising:
from 70% to 92% by volume of a phenolic-based polymeric resin,
from 6% to 22% by volume of PTFE, and
from 1.5% to 3.5% by volume of a molybdenum disulfide.

5. The braking unit according to claim 1, wherein the sliding coating is directly applied to the second guide surfaces, which include delimiting surfaces of a guide element of the support facing the first guide surfaces of the braking element or a lateral inner surface of a retaining spring for the braking element, which is integrally carried by the guide element of the support and in which the sliding coating cooperates by contacting and sliding against a guide portion of the braking element.

6. The braking unit according to claim 5, wherein the braking element comprises a block of friction material and a metallic support element that integrally supports the block of friction material upon a first face thereof which is designed to face in use towards an element to be braked; wherein the metallic support element is one of phosphate covered, zinc-nickel coated, or nitrated.

7. The braking unit according to claim 1, wherein the vehicle braking unit is a brake caliper unit for a disc brake.

8. The vehicle braking unit according to claim 1, wherein the polymeric resin layer contains a phenolic resin that has been cured at 400° C. for 30 minutes.

9. A vehicle braking element comprising:
a block of friction material; and
a metallic support element that integrally supports the block of friction material upon a first face thereof which is designed to face in use towards an element to be braked, the metallic support element comprising a guide portion for guiding the braking element within a guide element, wherein the guide portion is coated with a sliding layer comprising a phenolic-based polymeric resin within which there is dispersed as a particle matrix, a material selected from the group of: PTFE, molybdenum sulfide or disulfide and mixtures of PTFE and molybdenum sulfide or disulfide, the dispersed material being between 7% and 25% by volume of the total volume of the sliding layer and in which the total thickness of the sliding layer is between 200 and 300 microns.

10. The vehicle braking element according to claim 9, in which the element to be braked is a brake disc.

11. A method for manufacturing a vehicle braking element designed to limit the development of residual torque within a vehicle braking system comprising an element to be braked, a support for the braking element, and actuation elements that move the braking element towards the element to be braked, the braking element comprising a metallic element and a block of friction material integrally supported by said metallic support element upon one of its faces which in use is facing towards the element to be braked, the metallic support element comprising a guide portion for guiding the braking element inside a guide element of said braking element support;
wherein the method comprises:
making a raw metallic support element equipped with the guide portion;
covering the guide portion of the raw metallic support element with a sliding layer consisting of a phenolic-based resin having at least one of a low friction coefficient fluorinated polymer and a metallic sulfide dispersed therein;

heating/curing the metallic support element provided with the guide portion covered with the sliding layer at a temperature between 350 and 500° C.;

arranging screening elements on the guide portion in order to protect the sliding layer;

forming a layer of friction material upon the metallic support element, curing the friction material layer and painting the braking element thus obtained; and removing the screening elements in order to obtain a braking element having the guide portion delimited by a sliding surface having the sliding layer, said sliding layer being directly anchored to the metallic support element.

12. The method according to claim 11, wherein the element to be braked is a brake disc.

13. A method for obtaining a reduction in the residual torque within a vehicle braking system comprising a braking element, an element to be braked, a support for the braking element, and actuation elements for moving the braking element towards the element to be braked, the braking element comprising a metallic support element and a block of friction material integrally supported by said metallic support element upon one face thereof, which in use is facing the element to be braked, the metallic support element comprising a guide portion for guiding the braking element within a guide element of the braking element support, wherein the method comprises:

directly covering the guide portion of a raw metallic support element with a sliding layer comprising a phenolic-based resin having at least one of a low friction coefficient fluorinated polymer and a metallic sulfide dispersed as particles therein that are selected from the group of: PTFE, molybdenum sulfide or disulfide, and mixtures thereof, to the extent of between 7% and 25% by volume of the total volume of the sliding layer, in which the sliding layer has a total thickness between 200 and 300 microns; and heating/curing the sliding layer at a temperature equal to or higher than 300° C. for a time no longer than one hour.

14. The method according to claim 13, wherein the element to be braked is a brake disc.

15. The method according to claim 13, further comprising heating/curing the sliding layer for 30 minutes at 400° C.

16. A vehicle braking unit comprising:

a support designed to be positioned in use close to an element to be braked;

braking elements which are carried in a movable way by the support and which are suitable for cooperating, in use by friction, with the element to be braked;

actuation elements which are carried by the support and which are suitable, when activated, for pushing the braking elements against the element to be braked in order to apply upon the same, by friction, a braking torque; and first and second guide surfaces that are integral, with respect to the braking elements and the support, and that cooperate together to guide and support the braking elements when they are moved towards the element to be braked by the activation of the actuation elements, wherein at least one of the first and second guide surfaces are at least partially covered by a sliding coating having:

i)—a polymeric resin layer; and ii)—at least one of a low friction coefficient fluorinated polymer and a metallic sulfide dispersed within the polymeric resin layer and selected from the group of: PTFE, molybdenum sulfide or disulfide, and mixtures thereof, to the extent of between 7% and 25% by volume of the total volume of the sliding coating or layer, the total thickness of the sliding coating being between 200 and 300 microns.

17. The braking unit according to claim 16, in which the braking unit is a brake caliper unit for a disc brake.

* * * * *